United States Patent Office 2,742,491
Patented Apr. 17, 1956

2,742,491

PREPARATION OF β-AMINOPROPIONITRILE

John Weijlard, Maplewood, and Alan P. Sullivan, Jr., Scotch Plains, N. J., assignors to Merck & Co., Inc., Rahway, N. J., a corporation of New Jersey No Drawing. Application February 10, 1953, Serial No. 336,196

6 Claims. (Cl. 260—465.5)

This invention relates to an improved process for preparing β-aminopropionitrile, an important intermediate in the manufacture of pantothenic acid.

Heretofore, β-aminopropionitrile has been prepared by processes in which certain critical reaction conditions had to be observed in order to achieve reasonably good yields. For example, in one prior process the order of mixing the two reactants was found to be critical, addition of acrylonitrile to ammonia rather than the reverse being necessary for good yields. Another critical feature of this prior process was the relatively narrow reaction time required, thus making the process difficult to regulate and control even under ideal conditions.

An object of this invention is to provide a process for the manufacture of β-aminopropionitrile in overall yields of about 70% economically and efficiently without the necessity of observing the critical conditions required in prior methods, thus permitting greater freedom of manipulation and requiring no special operational precautions.

In accordance with this invention, β-aminopropionitrile is produced by reacting acrylonitrile with anhydrous ammonia in the presence of a tertiary lower aliphatic alcohol.

Among the suitable tertiary aliphatic alcohols which may be employed as solvents for the production of β-aminopropionitrile are tertiary butyl alcohol, tertiary amyl alcohol and triethyl carbinol. Although the amount of solvent used is not critical, it is preferred to use about 300 ml. of solvent for each mole of acrylonitrile reacted. A substantially lower ratio results in decreased yields of β-aminopropionitrile.

The quantity of anhydrous ammonia used in the reaction is not critical but it is preferred, for high yields of the product, to use two moles of ammonia per mole of acrylonitrile. Increased amounts of ammonia do not give increased yields and therefore it is preferred not to use ammonia in excess of this ratio.

In a preferred embodiment of this invention acrylonitrile and tertiary butyl alcohol are charged to a pressure vessel of suitable capacity and anhydrous ammonia added thereto. The mixture is then heated at 75° C. to 130° C. for from two to eight hours with agitation and at a pressure of about 150 to 350 pounds per square inch. After completion of the reaction the mixture is cooled, excess ammonia released, and the solvent is distilled off at atmospheric pressure. β-aminopropionitrile is isolated in about 70% yield from the residue by a fractional vacuum distillation, the desired nitrile distilling at 45–55° C. at a pressure of 1–3 mm. of mercury.

A temperature of 100–105° C. and a reaction time of four hours under a pressure of 150–200 pounds per square inch has been found to give optimum yields and is preferred. The reaction pressure is not critical but is that normally obtained by use of anhydrous ammonia under the conditions of this invention.

If desired, about 1% of diphenylamine, based on the weight of acrylonitrile, may be added to the reaction mixture as a corrosion and oxidation inhibitor. Its use generally results in somewhat greater yields of the final product.

The following example illustrates a method of carrying out the present invention but it is to be understood that this example is given primarily by way of illustration and not of limitation.

*Example*

Two hundred and twelve grams (4.00 moles) of acrylonitrile, diphenylamine (1% by weight of acrylonitrile) and 1200 ml. of tertiary butyl alcohol were charged to a chromium vanadium bomb of 3300 ml. capacity. The bomb was closed and 136 grams (8.0 moles) of anhydrous ammonia was blown in under nitrogen pressure. The contents of the bomb were heated to 100–105° C. and agitated at that temperature for four hours. The internal pressure during the reaction was 150–200 pounds per square inch.

The bomb was allowed to cool to room temperature and was vented to release excess ammonia pressure.

The light-colored, clear batch was concentrated in vacuo at about 50 mm. of mercury pressure to a final batch temperature of about 120° C. Substantially all of the tertiary butyl alcohol was thus recovered.

The dark-colored concentrate was then distilled through a 17-inch unpacked column at 45°–55° C. under 1–3 mm. of mercury pressure to yield 191.0 gm. of clear, colorless β-aminopropionitrile which was converted to high quality β-alanine in excellent yield.

Modifications may be made in carrying out the present invention without departing from the spirit and scope thereof and the invention is to be limited only by the appended claims.

We claim:

1. The process of producing β-aminopropionitrile which comprises reacting acrylonitrile with anhydrous ammonia in the presence of a tertiary lower aliphatic alcohol.

2. The process of producing β-aminopropionitrile which comprises reacting acrylonitrile with anhydrous ammonia in the presence of tertiary butyl alcohol.

3. The process of producing β-aminopropionitrile which comprises reacting acrylonitrile with anhydrous ammonia in the presence of tertiary amyl alcohol.

4. The process of producing β-aminopropionitrile which comprises reacting acrylonitrile with anhydrous ammonia in the presence of triethyl carbinol.

5. The process of producing β-aminopropionitrile which comprises charging acrylonitrile and tertiary butyl alcohol into a pressure vessel, introducing anhydrous ammonia into said vessel, the amounts of said acrylonitrile and said ammonia being in the ratio of about one mole of acrylonitrile to two moles of ammonia and heating the resulting mixture to between 75° C. to 130° C. for a period of between two to eight hours at an internal pressure of about 150 to 350 pounds pressure per square inch.

6. The process of producing β-aminopropionitrile which comprises charging acrylonitrile and tertiary butyl alcohol into a pressure vessel, introducing anhydrous ammonia into said vessel, the amounts of said acrylonitrile and said ammonia being in the ratio of about one mole of acrylonitrile to two moles of ammonia and heating the resulting mixture to about 100 to 105° C. for a period of about 4 hours at an internal pressure of about 150–200 pounds pressure per square inch.

References Cited in the file of this patent

UNITED STATES PATENTS

| | | |
|---|---|---|
| 1,992,615 | Hoffman et al. | Feb. 20, 1935 |
| 2,335,997 | Carlson et al. | Dec. 7, 1943 |
| 2,336,067 | Carlson et al. | Dec. 7, 1943 |
| 2,377,401 | Carlson et al. | June 5, 1945 |
| 2,448,013 | Buc et al. | Aug. 31, 1948 |